(12) United States Patent
Engler

(10) Patent No.: US 9,002,483 B1
(45) Date of Patent: Apr. 7, 2015

(54) DIPLOID CONTROL OF WATER HEATERS

(75) Inventor: Joseph J. Engler, Coggon, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 1009 days.

(21) Appl. No.: 13/051,751

(22) Filed: Mar. 18, 2011

(51) Int. Cl.
G05B 13/02 (2006.01)

(52) U.S. Cl.
CPC .................................. G05B 13/024 (2013.01)

(58) Field of Classification Search
USPC ................. 700/28, 32, 36, 47, 291, 299, 300; 122/13.01, 14.1, 14.2
See application file for complete search history.

(56) References Cited

U.S. PATENT DOCUMENTS

| | | |
|---|---|---|
| 6,909,198 B2 | 6/2005 | Ragwitz et al. |
| 6,975,925 B1 | 12/2005 | Barnes et al. |
| 7,047,169 B2 * | 5/2006 | Pelikan et al. ............... 703/2 |
| 7,272,584 B2 | 9/2007 | Diedrich et al. |
| 7,403,854 B1 | 7/2008 | Hurley et al. |
| 7,797,259 B2 | 9/2010 | Jiang et al. |
| 7,822,582 B2 | 10/2010 | Mertins et al. |
| 7,942,634 B2 | 5/2011 | Christensen |
| 8,041,417 B2 | 10/2011 | Jonckheere et al. |
| 8,050,899 B2 | 11/2011 | Giguere et al. |
| 8,060,340 B2 | 11/2011 | Gao et al. |
| 8,105,781 B2 | 1/2012 | Podgoreanu et al. |
| 8,150,641 B2 | 4/2012 | Morjaria et al. |
| 8,185,331 B2 | 5/2012 | Parikh et al. |
| 8,200,435 B2 | 6/2012 | Stiesdal |
| 8,202,048 B2 | 6/2012 | Stiesdal et al. |
| 8,265,798 B2 | 9/2012 | Imes |
| 8,272,265 B2 | 9/2012 | Bucher et al. |
| 8,290,634 B2 | 10/2012 | Larsen et al. |
| 8,332,077 B2 | 12/2012 | Kondo et al. |
| 2002/0029097 A1 | 3/2002 | Pionzio et al. |
| 2003/0160457 A1 | 8/2003 | Ragwitz et al. |
| 2004/0009063 A1 | 1/2004 | Polacsek |
| 2007/0067067 A1 | 3/2007 | Stommel |

(Continued)

FOREIGN PATENT DOCUMENTS

WO WO 2011/014712 2/2011

OTHER PUBLICATIONS

Engler et al., Agent-Based Control of Thermostatic Appliances, Green Technologies Conference, 2010 IEEE, Apr. 15-16, 2010, 5 pages.

(Continued)

Primary Examiner — Mohammad Ali
Assistant Examiner — Nathan Laughlin
(74) Attorney, Agent, or Firm — Angel N. Gerdzhikov; Donna P. Suchy; Daniel M. Barbieri

(57) ABSTRACT

A method of controlling a water heater is provided. The method comprises evaluating the fitness of solutions associated with a plurality of individuals in a population for a current operating environment of the water heater. Each of the plurality of individuals comprises a dominant genotype and a recessive genotype. Each genotype represents a solution for controlling the water heater. A fitness function is applied to the dominant genotype of each individual. The fitness function is based on at least one of water flow demand data and energy price data. The method further comprises storing previously encountered genotypes in the recessive genotypes of the individuals. The method further comprises selecting a solution for controlling operation of the water heater based on the fitness evaluation.

20 Claims, 6 Drawing Sheets

(56) References Cited

U.S. PATENT DOCUMENTS

| | | | |
|---|---|---|---|
| 2007/0112698 A1 | 5/2007 | McArdle |
| 2007/0124025 A1 | 5/2007 | Schram et al. |
| 2008/0183648 A1 | 7/2008 | Goldberg et al. |
| 2008/0195255 A1 | 8/2008 | Lutze et al. |
| 2009/0060740 A1 | 3/2009 | Stiesdal et al. |
| 2009/0100293 A1 | 4/2009 | LaComb et al. |
| 2009/0143871 A1 | 6/2009 | Gao et al. |
| 2009/0259521 A1 | 10/2009 | Yitts |
| 2009/0295165 A1 | 12/2009 | Giguere et al. |
| 2009/0299780 A1 | 12/2009 | Sarkar et al. |
| 2009/0327178 A1 | 12/2009 | Jacobson |
| 2010/0094474 A1 | 4/2010 | Larsen et al. |
| 2010/0117361 A1 | 5/2010 | Christensen |
| 2010/0133848 A1 | 6/2010 | Piasecki |
| 2010/0138182 A1 | 6/2010 | Jammu et al. |
| 2010/0148712 A1 | 6/2010 | Klatt |
| 2010/0204844 A1 | 8/2010 | Rettger et al. |
| 2010/0263167 A1 | 10/2010 | Fox |
| 2010/0280673 A1 | 11/2010 | Woste |
| 2011/0004356 A1 | 1/2011 | Garcia |
| 2011/0106324 A1 | 5/2011 | Tsadka et al. |
| 2011/0149268 A1 | 6/2011 | Marchant et al. |
| 2011/0202191 A1 | 8/2011 | Larsson et al. |
| 2011/0224926 A1 | 9/2011 | Morjaria et al. |
| 2011/0226892 A1 | 9/2011 | Crowther et al. |
| 2011/0245990 A1 | 10/2011 | Rasmussen |
| 2011/0307109 A1 | 12/2011 | Sri-Jayantha |
| 2012/0049516 A1 | 3/2012 | Viassolo |
| 2012/0059638 A1 | 3/2012 | Garate Lvaro |
| 2012/0078814 A1 | 3/2012 | Clark et al. |
| 2012/0169053 A1 | 7/2012 | Tchoryk et al. |
| 2013/0035798 A1 | 2/2013 | Zhou et al. |
| 2013/0046492 A1 | 2/2013 | Westergaard |
| 2013/0102379 A1 | 4/2013 | Sargent et al. |
| 2013/0121548 A1 | 5/2013 | Kovalan et al. |

OTHER PUBLICATIONS

Engler, Optimization of Test Engineering Utilizing Evolutionary Computation, Autotestcon, 2009 IEEE, Sep. 14-17, 2009, 6 pages.

Goldberg et al., Nonstationary Function Optimization Using Genetic Algorithm with Dominance and Diploidy, Proceedings of the Second International Conference on Genetic Algorithms on Genetic Algorithms and Their Application, 1987, 11 pages.

Kominami et al., A New Genetic Algorithm with Diploid Chromosomes Using Probability Decoding for Adaption to Various Environments, Electronics and Communications in Japan, 2010, 9 pages.

Office Action for U.S. Appl. No. 13/224,648, mail date Jul. 22, 2013, 17 pages.

Papadopoulos et al., Engineering Failure Analysis and Design Optimisation with Hip-Hops, Engineering Failure Analysis, Mar. 2011, 19 pages.

Sheth et al., Evolving Agents for Personalized Information Filtering, IEEE, 1993, 8 pages.

Wu et al., A Diploid Genetic Approach to Short-Term Scheduling of Hydro-Thermal System, IEEE Transactions on Power Systems, 2000, 7 pages.

Notice of Allowance for U.S. Appl. No. 13/051,787, mail date Sep. 26, 2013, 8 pages.

Office Action for U.S. Appl. No. 13/051,672, mail date Oct. 15, 2013, 9 pages.

U.S. Appl. No. 13/051,672, filed Mar. 18, 2011, Rockwell Collins, Inc.

U.S. Appl. No. 13/051,717, filed Mar. 18, 2011, Rockwell Collins, Inc.

U.S. Appl. No. 13/051,787, filed Mar. 18, 2011, Rockwell Collins, Inc.

U.S. Appl. No. 13/051,835, filed Mar. 18, 2011, Rockwell Collins, Inc.

U.S. Appl. No. 13/051,849, filed Mar. 18, 2011, Rockwell Collins, Inc.

Bookstaber, A Recessive/Dominant Genetic Algorithm, 2003, 11 pages.

Giebel, The State-of-the-Art in Short-Term Prediction of Wind Power, A Literature Overview, Version 1.1, Project ANEMOS, Contract No. ENK5-CT-2002-00665, Aug. 2003, 36 pages.

Kennel et al., Determining Embedding Dimension for Phase-Space Reconstruction Using a Geometrical Construction, The American Physical Society, 1992, 9 pages.

Kusiak et al., Analysis of Wind Turbine Vibrations based on SCADA Data, Journal of Solar Energy Engineering, 2009, 13 pages.

Kusiak et al., Anticipatory Control of Wind Turbines with Data-Driven Predictive Models, IEEE Transactions on Energy Conversion, Sep. 2009, 9 pages.

Kusiak et al., Prediction of Status Patterns of Wind Turbines: A Data-Mining Approach, Journal of Solar Energy Engineering, Feb. 2011, 10 pages.

Kusiak et al., Short-Horizon Prediction of Wind Power: A Data-Driven Approach, IEEE Transactions on Energy Conversion, Dec. 2010, 11 pages.

Kusiak et al., Short-Term Prediction of Wind Farm Power: A Data Mining Approach, IEEE Transactions on Energy Conversion, Mar. 2009, 12 pages.

Lei et al., Prediction of Wind Power Generation based on Chaotic Phase Space Reconstruction Models, Power Electronics and Drive Systems, 2007, 5 pages.

Saad-Saound et al., Models for Predicting Flicker Induced by Large Wind Turbines, IEEE Transactions on Energy Conversion, Sep. 1999, 6 pages.

Schnier et al., Dominant and Recessive Genes in Evolutionary Systems Applied to Spatial Reasoning, University of Sydney, Key Centre of Design Computing, 1997 10 pages.

Sedighizadeh et al., A Self-Tuning PID Control for a Wind Energy Conversion System Based on the Lyapunov Approach, Universities Power Engineering Conference, Sep. 2008, 6 pages.

Tian-Hua et al., Study on the Turntable Hydraulic Variable Structure Control Based on Lyapunov Theory, 2009 International Conference on Measuring Technology and Mechatronics Automation, Apr. 2009, 6 pages.

Yanning et al., Wind Speed Predicted by Wavelet Analysis in Input Prediction Control of Wind Turbine, Proceedings of the 7th World Congress on Intelligent Control and Automation, Jun. 2008, 4 pages.

Zhang et al., Time Series Prediction Using Lyapunov Exponents in Embedding Phase Space, Computers and Electrical Engineering 30, 15 pages.

Zheng et al., Prediction of Wind Farm Power Ramp Rates: A Data-Mining Approach, Journal of Solar Engineering, 2009, 9 pages.

Office Action for U.S. Appl. No. 13/051,672, mail date Jun. 12, 2013, 10 pages.

Office Action for U.S. Appl. No. 13/051,787, mail date Jun. 20, 2013, 16 pages.

Notice of Allowance for U.S. Appl. No. 13/051,835, mail date Jun. 11, 2013, 11 pages.

Notice of Allowance for U.S. Appl. No. 13/051,717, mail date Mar. 28, 2013, 19 pages.

Notice of Allowance for U.S. Appl. No. 13/051,849, mail date Apr. 1, 2013, 12 pages.

\* cited by examiner and recessive genotypes of the individuals. The method further comprises selecting a solution for controlling operation of the water heater based on the fitness evaluation.

DIPLOID CONTROL OF WATER HEATERS

CROSS-REFERENCE TO RELATED APPLICATIONS

The present disclosure is related to U.S. patent application Ser. No. 13/051,835, titled "Explicit Diploid Evolutionary Control", U.S. patent application Ser. No. 13/051,849, titled "Random Emigrant Strategy for Explicit Diploid Evolutionary Control", U.S. patent application Ser. No. 13/051,672, titled "Prediction Method", U.S. patent application Ser. No. 13/051,717, titled "Agent-Based Chaotic Control of Wind Turbines", and U.S. patent application Ser. No. 13/051,787, titled "Wind Prediction for Wind Farms Through the Use of Weather Radar", all of which were filed concurrently with the present application and all of which are incorporated herein by reference.

BACKGROUND

The present disclosure relates generally to the field of process control systems. More particularly, the present disclosure relates to the control of appliances.

Optimization and modeling algorithms are used to optimize and model various environments. Some systems utilize biologically inspired algorithms (e.g., genetic algorithms, particle swarm intelligence, evolutionary strategies, etc.) to perform optimization and modeling due to their ability to properly learn and optimize variant environments rapidly. Genetic algorithms may be relatively slow and ineffective at handling environments which change during optimization. Such genetic algorithms may need to be restarted to effectively handle the changes upon detection of an environmental change, which may result in poor performance of the algorithm. Biologically inspired algorithms also are not equipped to maintain memory of previously encountered environments and must be restarted from scratch upon significant environmental change detection. This may result in poor performance and/or abandonment of the methodology for optimization and modeling.

Hot water heaters cycle a heating device through employment of a control using a hysteresis loop that activates heating at a set low temperature point and stops heating at a set high temperature point. This causes the appliance to cycle as a function of the internal tank water temperature measured at the point of the temperature sensor without regard to usage pattern, demand, and/or the current price of energy. Other household or industrial appliances designed to heat or cool such as boilers, chillers, and furnaces operate in a similar manner. Excess energy may be consumed to heat the water to the set high temperature point when there is little or no demand. Additionally, the water may be heated without regard to energy price fluctuations.

SUMMARY

One embodiment of the disclosure relates to a method of controlling a water heater. The method comprises evaluating the fitness of solutions associated with a plurality of individuals in a population for a current operating environment of the water heater. Each of the plurality of individuals comprises a dominant genotype and a recessive genotype. Each genotype represents a solution for controlling the water heater. A fitness function is applied to the dominant genotype of each individual. The fitness function is based on at least one of water flow demand data and energy price data. The method further comprises storing previously encountered genotypes in the recessive genotypes of the individuals. The method further comprises selecting a solution for controlling operation of the water heater based on the fitness evaluation.

Another embodiment of the disclosure relates to a control system. The control system comprises an electronic processor configured to evaluate the fitness of solutions associated with a plurality of individuals in a population for a current operating environment of the water heater. Each of the plurality of individuals comprises a dominant genotype and a recessive genotype. Each genotype represents a solution for controlling the water heater. A fitness function is applied to the dominant genotype of each individual. The fitness function is based on at least one of water flow demand data and energy price data. The processor is further configured to control operation of the water heater based on a genotype selected based on the fitness evaluation. The processor is further configured to store previously selected genotypes in the recessive genotypes of the individuals.

Another embodiment of the disclosure relates to a non-transitory computer-readable medium having instructions stored thereon. The instructions are executable by a processor to execute a method comprising generating a population comprising a plurality of individuals. Each individual comprises a dominant genotype and a recessive genotype. Each genotype represents a solution for controlling the water heater. The method further comprises evaluating the fitness of the solutions associated with the plurality of individuals for a current operating environment of the water heater by applying a fitness function to the dominant genotype of each individual. The fitness function is based on at least one of water flow demand data and energy price data. The method further comprises storing previously encountered genotypes in the recessive genotypes of the individuals. The method further comprises controlling operation of the water heater based on a dominant genotype selected based on the fitness evaluation.

DETAILED DESCRIPTION

Figure 1A:
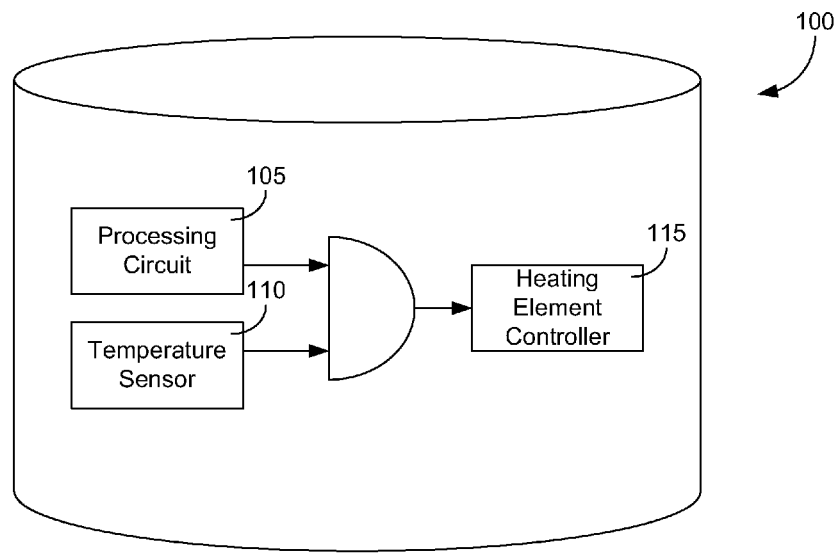
FIG. 1A is an illustration of a water heater according to an exemplary embodiment.

Referring generally to the figures, systems, methods and algorithms for controlling a water heater using diploid evolutionary control are shown according to various exemplary embodiments. Genetic algorithms may be used to analyze a system operating environment and determine solutions that are most fit to allow the system to achieve certain goals. Genetic algorithms may evaluate a group of individuals in a population against a fitness function to determine which individuals are most fit to achieve the goals. Each of the individuals includes at least one genotype that represents a solution for controlling the system.

For example, in some embodiments, a genetic algorithm may be used to analyze solutions for controlling a water heater. The environment being analyzed may include any factors that may affect the operation of the water heater, such as the temperature of the water in the tank, the cost of the energy (e.g., electrical energy) used to heat the water, the time of day and/or day of week, the demand for water from the water heater, and/or other factors. A population of individuals may be generated such that each individual represents one or more solutions for controlling the water heater over a particular timeframe. For example, each individual may include a genotype (e.g., a data structure, such as a bit string container) configured to store a solution for controlling the water heater (e.g., a bit string or other value that defines how a controller of the water heater controls the heating elements of the water heater over a particular period of time). For example, a first bit string stored in a genotype of one individual may cause the controller to activate the heating element and heat the water frequently during daytime hours and less frequently in the evening. A second bit string stored in a genotype of another individual may cause the controller to activate the heating element infrequently during daytime hours and more frequently in the evening. The population of individuals may represent and/or contain all solutions that are to be examined in light of the fitness function.

The fitness function may be designed and/or customized for particular applications and/or to meet particular goals. For example, the fitness function may be configured to favor solutions that heat the water during a time when the water is most likely to be used. The system may be configured to collect flow demand data for different days and/or times to determine when the water heater is typically in use and not in use. If the flow demand data indicates that the water heater is used mainly in the evening, such a fitness function may determine the individual having the second bit string stored in its genotype (i.e., the bit string that causes the heating element to be activated more frequently in the evening) to be more fit than the individual having the first bit string stored in its genotype. In another example, the fitness function may be configured to favor solutions that heat the water during a time when energy costs are lowest. If energy costs are lower during daytime hours than in the evening, such a fitness function may determine the individual having the first bit string stored in its genotype (i.e., the bit string that causes the heating element to be activated more frequently in the daytime) to be more fit than the individual having the second bit string stored in its genotype.

In some embodiments, a haploid genetic algorithm may be used to control a system. Haploid genetic algorithms, or genetic algorithms using a single genotype to represent each individual in the population of the algorithm, may react ineffectively to changes in environmental conditions.

Various exemplary embodiments disclosed herein provide intelligent and adaptive control of water heaters using agent-based explicit diploid evolutionary control methods to observe and record hot water usage patterns and/or energy price and may apply an energy use optimization control schema with perpetual optimization. Various exemplary embodiments disclosed herein generate a population of individuals used to test various possible solutions to control the water heater and select the best solution.

The individuals are represented using a diploid representation where each individual is represented using a dominant genotype and a recessive genotype. Diploid individuals are configured to store two separate solutions for the system, one in a dominant genotype and one in a recessive genotype. The solutions stored in the dominant genotypes may represent a main group of solutions to be evaluated for fitness in addressing the goals represented within the fitness function. The recessive genotype of each individual is used to maintain a memory or history of previous best individuals based on fitness evaluations for rapid environmental change detection and adjustment. For example, in the context of a water heater-related embodiment, each individual in the population may include a dominant genotype configured to store a first bit string that may be used to control a water heater in a first manner and a recessive genotype configured to store a second bit string that may be used to control a water heater in a second manner. The second bit string may be a bit string that was previously evaluated using the fitness function and determined to be an appropriate, or fit, solution for a set of previously encountered environmental conditions (e.g., water temperature, flow demand, time and/or day, etc.).

Exemplary embodiments disclosed herein may provide memory of good solutions for previously encountered water heater conditions, rapid convergence of control algorithms to changes in the water heater environment, and/or maintenance of diversity within the population of the algorithms. Diploid control methods disclosed herein may provide heating of water in the water heater based on learned anticipated demand and/or when an energy cost/energy usage goal is satisfied. While various embodiments are described with respect to electric water heaters, embodiments may be applicable to gas powered water heaters, boilers, chillers, furnaces, and other types of household and industrial appliances.

Referring now to FIG. 1A, a home electrical water heater 100 is shown according to an exemplary embodiment. Approximately fifty percent of water heaters purchased in the United States are electric water heaters. Water heater 100 is configured to heat water by converting electrical energy into thermal energy and transferring heat to water (e.g., within a tank) using a heating element. The temperature of the water stored in the water heater may be monitored using a temperature sensor 110 (e.g., thermocouple, thermistor, RTD, etc.). Water heater 100 may be controlled by providing a signal or signature (e.g., a string of bits) that cycles the heating element on and off to achieve a water temperature within a desired range. The heating element may be activated and deactivated by processing circuit 105 and/or a separate heating element controller 115. In some embodiments, water heater 100 may be controlled using a hysteresis loop that activates heating at a low water temperature set point and stops heating at a high water temperature set point. The low water temperature set point and high water temperature set point may be provided by processing circuit 105 and the current water temperature may be provided by temperature sensor 110. If the current temperature is below the low water temperature set point, heating element controller 115 may activate the heating element. If the temperature rises above the high water temperature set point, heating element controller 115 may deactivate the heating element. In some embodiments, water heater 100 may include one or more heating devices or elements that may be heated through other energy sources such as natural gas.

Figure 1B:
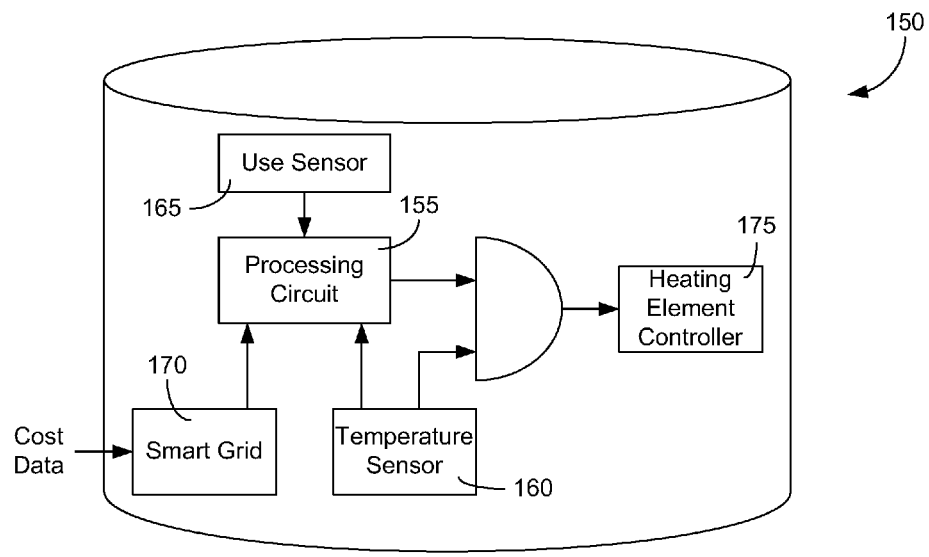
FIG. 1B is an illustration of a water heater according to another exemplary embodiment.

Referring now to FIG. 1B, a water heater 150 is shown according to another exemplary embodiment. In some embodiments, the heating element of a water heater may be controlled using a diploid evolutionary control method. The diploid evolutionary control method may be executed by a processing circuit 155. Processing circuit 155 may be configured to receive temperature data relating to the temperature of the water in the water heater from a temperature sensor 160. A use sensor 165 (e.g., a flow meter or a flow logger configured to measure the volume of water flowing through and input and/or output pipe of water heater 150) may provide data regarding the flow or volume of water demanded from the water heater.

In some embodiments, water heater 150 may receive the current price of energy (e.g., instantaneous, average, periodic, etc.) from a smart grid at a smart grid interface 170, computer via a wired or wireless connection, etc. The coming smart grid is intended to be capable of conveying the current price of electricity to smart household and industrial appliances. In some embodiments, the spot price of natural gas may be conveyed to a water heater such that embodiments disclosed herein that take into account the price of energy may also be applied to gas-powered water heaters.

Processing circuit 155 may be configured to monitor and store environmental data relating to the water heater (e.g., water flow demand data, energy cost data, temperature data, etc.) over a period of time. The data may be time stamped such that the data is associated with a particular time, date, day of the week, time of year (e.g., month or season), etc. The data may be used to generate a fitness function that evaluates the fitness of possible control solutions (e.g., values that represent a control signal used to control water heater 150 over a period of time) to determine an appropriate solution under current environmental conditions (e.g., time and/or date, current flow demand, current energy price, etc.) for controlling water heater 150. Good solutions encountered over time for different water heater environmental conditions may be stored and utilized in the event of recurrence of similar environmental conditions.

For example, collected data may show that water heater 150 is used very little during the hours of 10 AM and 7 PM on weekdays. In such an example, the fitness function may determine a solution that keeps the heating element off for most of this time period on weekdays to be more fit for controlling water heater 150 during this time than a solution that turns the heating element on frequently within this time range. In another example, collected data (e.g., from a smart grid) may indicate that energy is very expensive during evening hours on weekdays and less expensive during daytime hours. In such an example, the fitness function may determine a solution that heats the water more during low-cost daytime hours and avoids turning the heating element on frequently during expensive evening hours on weekdays, which may be more fit than a solution that heats the water frequently during the expensive evening hours.

In yet another example, water heater 150 may be used very little during daytime hours on weekdays and frequently in the evening hours, and energy may cost more during the evening hours. In such an example, the fitness function may be designed to balance between the cost of heating the water and the demand for the water in the evening. In some embodiments, the fitness function may be designed to activate the heating element frequently during the inexpensive later daytime hours and then activate the heating element sparingly during the evening hours to maintain the temperature while controlling cost. In other embodiments, the fitness function may be designed to activate the heating element frequently in the evening when demand is high with only slight regard to the increased cost of energy during that time. In some embodiments, the balance between flow demand and cost may be based in part on input from a user of the water heater.

Once a control solution has been determined, a control signal (e.g., a bit string) associated with the selected solution may be used (e.g., by processing circuit 105 and/or a different heating element control circuit) to cycle power to the heating element over a particular period of time (e.g., 1 minute, 15 minutes, 1 hour, 4 hours, 1 day, etc.). For example, a bit string may be generated indicating when the heating element should be cycled on and off. In one example, a bit string of "0011001110" may be used to control the water heater over a time period of ten minutes. The bit string may indicate that the heating element should be turned off for the first two minutes, turned on for the third and fourth minutes, turned off again for the fifth and sixth minutes, turned on again for the seventh, eighth, and ninth minutes, and turned off again for the tenth minute. In some embodiments, water heater 150 may be configured to utilize a normal hysteresis loop operation mode in the event a demand for hot water is made during a time when the diploid evolutionary control method would not meet the demand.

When water heaters are controlled without accounting for changing conditions such as usage pattern, flow demand, and energy price, energy may be consumed in an inefficient manner (e.g., to heat water to an upper set point when there is little or no demand, heat water during a time of high energy prices, etc.). Exemplary embodiments disclosed herein may be applied to any type of water heater, such as a tank type water heater or a tankless type water heater. Use of diploid evolutionary control was demonstrated to result in a reduction of electrical power usage of up to 68 percent in a home electrical water heater, and mathematical modeling indicates a possible reduction of up to 69 percent. It has been estimated that thirteen percent of U.S. domestic energy consumption may be attributed to water heating applications. Full penetration of explicit diploid evolutionary technology with an estimated energy/cost savings in the range of 70 percent could potentially reduce U.S. domestic energy consumption by up to nine percent, with attendant reduction in fossil fuel dependence, emissions reductions and benefits to U.S. security posture.

Figure 2:
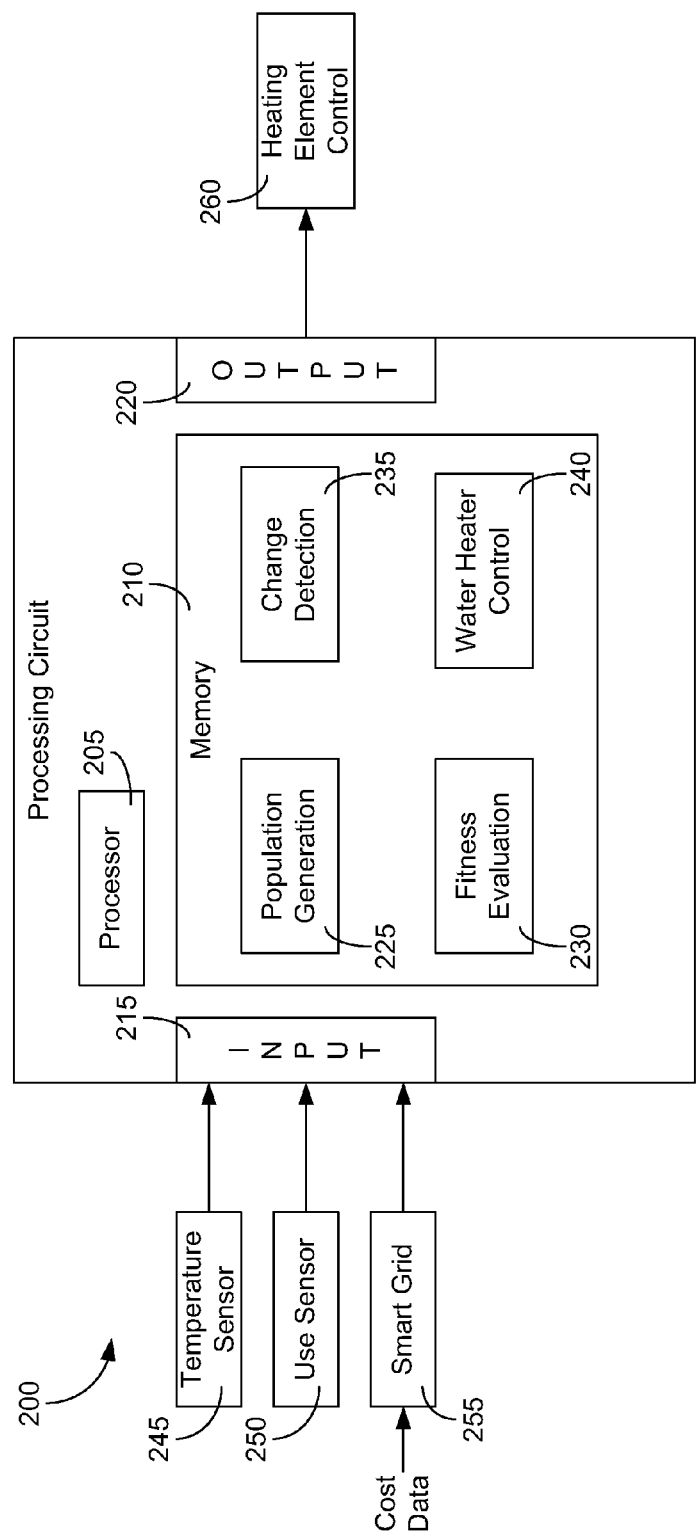
FIG. 2 is a block diagram of a processing circuit configured to control a process using diploid control according to an exemplary embodiment.

Referring now to FIG. 2, a block diagram of a processing circuit 200 (e.g., an electronic processor) configured to control a process using a diploid evolutionary method is shown according to an exemplary embodiment. Processing circuit 200 includes at least one processor 205, which may be any general purpose or special purpose processor (e.g., FPGA, CPLD, ASIC, etc.). In some embodiments, processor 205 may be chosen based on the type of application with which processing circuit 200 is being utilized. Processing circuit 200 also includes a memory 210 that may be any type of computer or machine-readable media (e.g., hard drive, flash memory, ROM, RAM, EEPROM, CD, DVD, etc.). Processing circuit 200 may also include an input interface 215 for receiving input data relating to the system or process being controlled and an output interface 220 for outputting signals used to control the system or process. Input interface 215 may be configured to receive data from a temperature sensor 245 (e.g., temperature data for the water in the water heater), use sensor 250 (e.g., flow demand data), and/or smart grid interface 255 (e.g., energy cost or price data). Output interface 220 may be configured to transmit data (e.g., control signals) to a heating element controller 260. In some embodiments, processing circuit 200 may be used to control the operation of a water heater (e.g., water heater 100 or 150) according to a diploid evolutionary control method. In other embodiments, processing circuit 200 may be used in conjunction with other types of applications, such as HVAC systems, refrigeration systems, ice making systems, boilers, furnaces, and/or various other residential or industrial systems, appliances or processes.

Memory 210 may be configured to store one or more modules having instructions that are executable by processor 205. For example, memory 210 may include a population generation module 225 configured to generate a population of individuals for use in modeling an environment. The fitness of each individual within the context of the environment may be evaluated by a fitness evaluation module 230, and the population may be modified or adjusted based on the fitness evaluation. Memory 210 may also include a change detection module 235 configured to detect a change in the environment of the system or process being controlled by processing circuit 200. Change detection module 235 may be configured to modify the population based on the detected environmental change. Memory 210 may also include a water heater control module 240 configured to control the cycling of a water heater using diploid evolutionary control by interacting with modules 225, 230, and/or 235.

Figure 3:
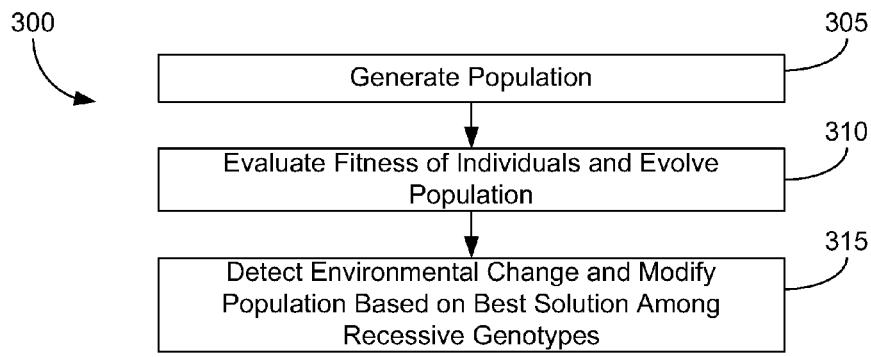
FIG. 3 is a flow diagram of a method of controlling a process using a diploid evolutionary algorithm according to an exemplary embodiment.

Referring now to FIG. 3, a flow diagram of a method 300 for controlling a system or process using diploid evolutionary control is shown according to an exemplary embodiment. In some embodiments, method 300 and/or other methods or processes disclosed herein may be implemented using a diploid evolutionary algorithm executed by a processing circuit (e.g., processing circuit 200).

At step 305, a population of individuals is generated (e.g., by population generation module 225) to model the environment being controlled. Each individual may store one or more genotypes that may be values representing solutions for controlling the operation of a system associated with the environment. In the context of water heaters, each solution may represent a value or bit pattern (e.g., binary string) that defines when the heating element will be turned on and off over a particular time range.

Evolutionary computation algorithms have been represented using a haploid representation in which each individual is represented by a single genotype. In the case of a genetic algorithm with binary bit string definitions, a haploid representation of each organism may be defined as follows:

$$ind_i = \{x_1, x_2, \ldots, x_n\} \text{ with } n \epsilon R^2 \text{ and } x \epsilon \{0,1\}$$

In this definition, $ind_i$ is the $i^{th}$ individual or organism in the population of the genetic algorithm. At each iteration of the genetic algorithm, the haploid genotype is evaluated against an optimization function and then subjected to evolution via mutation and crossover. During the run of the evolutionary algorithm, the haploid representation may constantly be searching for the global optima of the search space.

In method 300, each individual in the population is represented using a diploid representation such that each individual has associated therewith both a dominant genotype and a recessive genotype. The dominant genotype of each individual may be used in evaluation and implementation of the current control solution, while the recessive genotype of each individual may be used to memorize solutions to previously encountered environments. Each individual in the population of a genetic algorithm with binary bit string definitions may be defined as follows:

$$ind_i = \begin{cases} x = \{x_1, x_2, \ldots, x_n\} \\ y = \{y_1, y_2, \ldots, y_n\} \end{cases} \text{ where } x_j, y_j \in \{0, 1\}$$

The vector x represents the dominant genotype and the vector y represents the recessive genotype of individuals in the population. In embodiments in which method 300 is applied to control a water heater, each of the dominant genotype and the recessive genotype may represent possible control signals (e.g., bit patterns) for turning the heating element on and off over a period of time.

Figure 4:
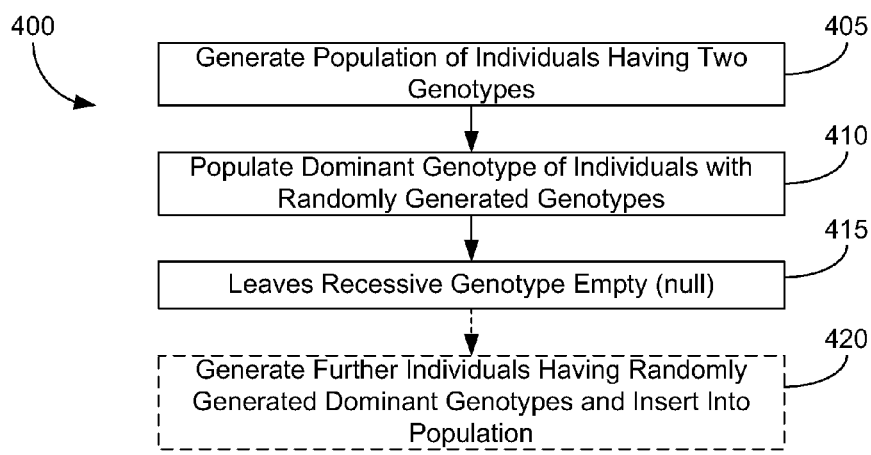
FIG. 4 is a flow diagram of a method of generating a population of individuals for use in controlling a process according to an exemplary embodiment.

Referring now to FIG. 4, a flow diagram of a method 400 including operations that may be performed as part of step 305 of method 300 is shown according to an exemplary embodiment. At step 405, a population of individuals having a diploid, or two genotype, representation is generated. The dominant genotype of each individual is populated with an initial genotype (step 410). In some embodiments, the dominant genotype may be randomly generated for each individual in the population. Utilizing randomly generated dominant genotypes may increase diversity of the achieved solution. The recessive genotype may be set to be empty, or null (step 415).

In some embodiments, further individuals may be generated and inserted or injected into the population after the initial population has been generated (step 420). As with the individuals initially generated for the population, the additional individuals, or emigrants, may be assigned a randomly generated dominant genotype and an empty recessive genotype. Injecting new randomly defined individuals into the population may enhance the diversity of the population and/or promote exploration of the environment by the algorithm. One or more new individuals may be injected into the population at predefined times, periodically, based on specified conditions, randomly, etc. In some embodiments, the frequency with which new individuals are generated and/or the number of individuals generated may be based on a defined probability (e.g., a user-defined probability).

Referring again to FIG. 3, at step 310, the fitness of each individual in the population for the environment being controlled is evaluated. Fitness evaluation may be performed on the dominant genotype of each individual. Fitness evaluation may be performed based on a fitness or optimization function configured to identify the fitness of each individual for the problem being solved or the process, system and/or environment being controlled. In some embodiments, the output of the fitness function may be proportional to the fitness of the individual to which the fitness function is applied for the solution being sought (e.g., such that a higher fitness function output indicates a more fit individual for the solution). In various different embodiments, fitness functions may be modified and/or customized to particular applications and/or parameters (e.g., different types of water heaters). According to various exemplary embodiments, fitness functions may be directed to a single objective or multiple objectives and may be defined explicitly for a problem or application under consideration.

Parents are selected for evolution based on the results of the fitness evaluation of each individual in the population. Once the parents have been selected, the population is evolved by performing recombination and mutation on the selected parents until a new or updated population has been generated.

In some embodiments, fitness evaluation may be performed to determine a solution for controlling a water heater. Each genotype evaluated may represent a different control signal (e.g., bit string) that may be used to control the water heater. The fitness function used to evaluate the genotypes may be based on temperature data (e.g., received from a temperature sensor), flow demand data (e.g., received from a user sensor or flow meter), energy cost data (e.g., received from a smart grid interface), and/or other types of water heater environmental data. The fitness function may use historical data stored in a memory to predict what flow demand and/or energy cost may be at a particular time and evaluate the fitness of different genotypes in part based on a current time, date, day of week, month, season, etc. In some embodiments, the fitness function may be designed to balance anticipated water demand with predicted energy cost. One or more good solutions for the current water heater conditions may be identified using the fitness function, and the corresponding control signal may be used to control the water heater. The selected genotype(s) may be used to evolve the population and arrive at other good control solutions for the water heater.

Figure 5:
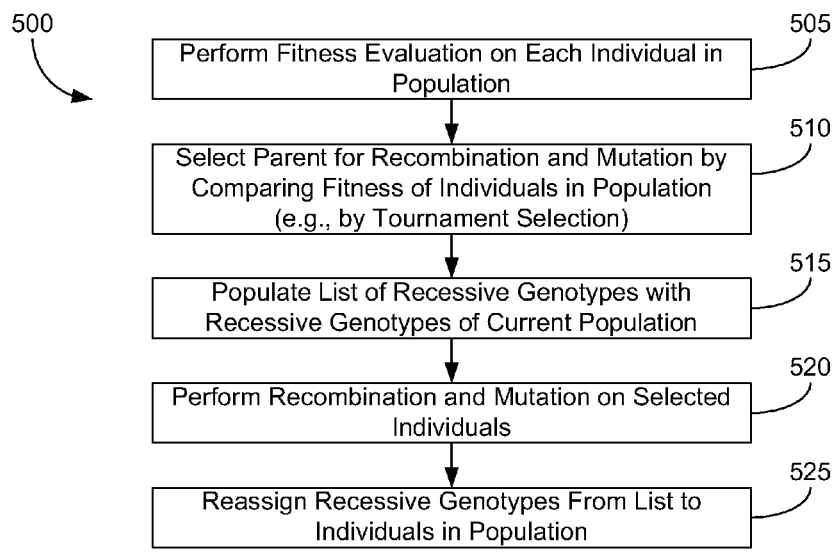
FIG. 5 is a flow diagram of a method of evaluating the fitness of a population of individuals and modifying the population based on the fitness evaluation according to an exemplary embodiment.

Referring now to FIG. 5, a flow diagram of a method 500 including operations that may be performed as part of step 310 of method 300 is shown according to an exemplary embodiment. At step 505, a fitness evaluation is performed on each individual in the population. The fitness evaluation may be performed by applying a fitness or optimization function to the dominant genotype of each individual.

Parents are then selected for recombination and mutation based on the results of the fitness evaluation of each of the individuals (step 510). In some embodiments, parents may be chosen through a tournament selection process. In the tournament selection process, individuals may be arranged in a tournament style such that adjacent pairs of individuals compete head-to-head, or are compared against each other for fitness. The individual with the greater fitness in each comparison proceeds to the next round to face another individual, and this process continues until a "winner" of the tournament, or best individual, is decided. The tournament algorithm may construct a tournament tree reflecting the tournament comparisons. The second-best individual must be among the direct losers to the best individual. These direct losing individuals may be determined by stepping through the first tournament tree and a second tournament may be held between the direct losing individuals to determine a second-best individual. The third-best individual must be among the direct losers of the second-best individual in either the first or second tournament trees, and another tournament may be held to determine the third-best individual. This process continues until the desired amount of parent individuals has been obtained. In some embodiments, each parent chosen for recombination and mutation of the n individuals in the population may be provided as follows:

$$selected_i = \mathrm{argmax}_i f(i)$$

In the above, f(i) is the fitness of the $i^{th}$ individual in the population as measured against the fitness function. In some embodiments, two individuals will be selected for evolution of the population. In other embodiments, more than two (e.g., four, eight, etc.) will be chosen for recombination and mutation. In some embodiments, selection methods other than tournament selection may be used to select individuals from the population (e.g., roulette wheel, probabilistic weighting, etc.). In various embodiments, any selection methodology that accounts for the fitness of the individuals in relation to the fitness function may be used.

The recessive genotypes of the current population may be saved in a list of recessive genotypes (step 515) and recombination and mutation may be performed on the dominant genotype of the individuals of the population (step 520). Recombination may be performed by crossing over portions (e.g., bits for a bit string population) of the dominant genotype of the selected parents to generate new individuals for the evolved population. In some embodiments, a crossover rate may be provided (e.g., user-defined, predefined, random, etc.) upon which the crossover of parents may be based. The parents and/or new individuals may also be subjected to mutation by flipping (e.g., randomly) the allele of one or more loci of the dominant genotype. For binary bit string individuals, for example, mutation may involve randomly flipping the value of one or more bit string positions in the dominant genotype. The determination of which values to flip may be based upon a probability that is provided as a parameter. The recessive genotypes added to the recessive genotype list may be reassigned to individuals within the newly evolved population (step 525). In some embodiments, the recessive genotypes may be reassigned to individuals within the newly evolved population at random. Storing recessive genotypes at the time of performance of an evolutionary algorithm may be referred to as utilizing explicit memory.

Referring again to FIG. 3, environmental changes may be detected and the current population may be modified based on the best or most fit solution among the recessive genotypes in the population (step 315). A change in the environmental conditions may be detected by monitoring the best fitness of the population (e.g., the fitness of the most fit individual based on the evaluation of the dominant genotype of each individual against the fitness function) for changes. When a substantial change, or a best fitness change above a particular threshold, is detected, the current best solution (e.g., the dominant genotype of the individual having the best fitness) may be saved within the recessive genotype of one of the individuals in the population and the best solution to the new changed environment may be determined from among the recessive genotypes of the current population. The population may be evolved based on the newly determined best saved solution.

In the context of a water heater control application, the detected change in conditions may correspond to a new time of day or day of week, a change in flow demand, a change in temperature of the water in the water heater, a change in the cost of energy, and/or other changes in water heater environment conditions. The best solution(s) of the previous generation (e.g., the control signal determined most fit to control the water heater under the previous flow demand, energy cost, and/or other environmental conditions) is saved in a recessive genotype of an individual in the population. Other good solutions to previously encountered environmental conditions of flow demand, energy cost, etc. may be stored in recessive genotypes in the population. The recessive genotypes may be evaluated to determine if a recessive genotype contains a solution, or control algorithm, that is well fit to control the water heater (e.g., corresponds to conditions of flow demand, energy cost, etc. that are similar to the changed conditions). The best control solution from the recessive genotypes may be selected to control the water heater and/or evolve the population.

Figure 6:
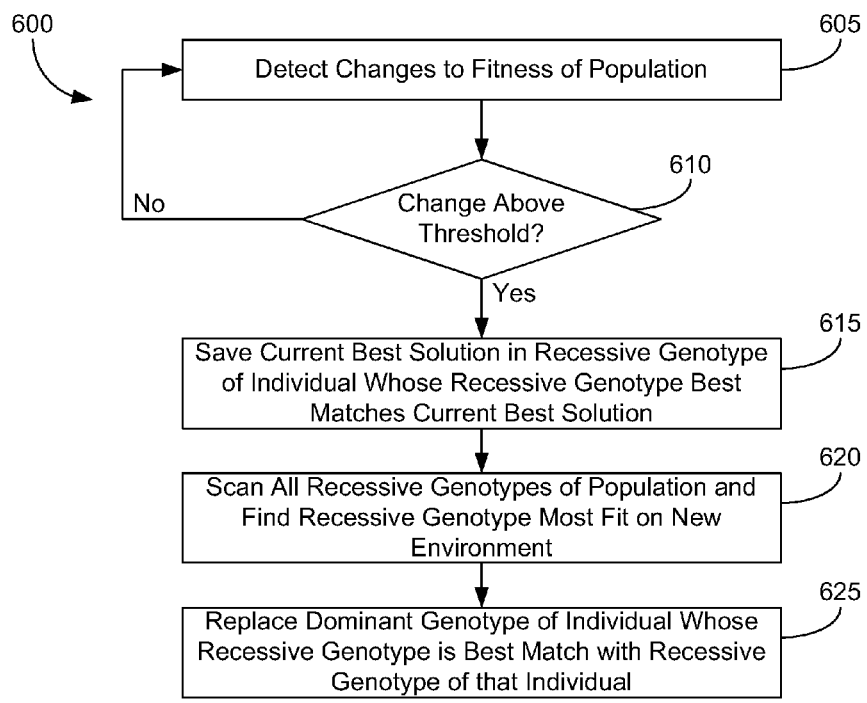
FIG. 6 is a flow diagram of a method of detecting and reacting to an environmental change of a controlled process according to an exemplary embodiment.

Referring now to FIG. 6, a flow diagram of a method 600 including operations that may be performed as part of step 315 of method 300 is shown according to an exemplary embodiment. At step 605, the fitness of the population is monitored (e.g., periodically, continually, after the occurrence of specified events or upon detection of particular input values, etc.) to detect any changes to the environment being monitored and/or controlled. A parameter or threshold 8 may be provided (e.g., user-supplied, predefined, etc.) and used to determine whether a decrease in the best fitness of the population signifies a significant environmental change such that a new best solution should be determined from a history or memory of previous solutions stored in the recessive genotypes of individuals in the current population. In some embodiments, a substantial change is detected as follows:

$$\text{change} = \begin{cases} \text{true if} & f(t) - f(t-1) > \varepsilon \\ \text{false} & \text{otherwise} \end{cases}$$

In the above, f(t) is the fitness of the best individual in the population at time t and f(t−1) is the fitness of the best individual in the population at a time prior to t. At step 610, it is determined whether a change above the threshold has been detected. If not, the best fitness of the population continues to be monitored (step 605).

The recessive genotypes of each of the individuals of the population operate to store a memory or history of previous environments. Specifically, the recessive genotypes are used to store previously encountered genotypes (e.g., dominant genotypes), such as dominant genotypes of best fit individuals from previous generations of the population.

If a change above the threshold has been detected, the current best solution, or dominant genotype of the individual in the current population having the best fitness, is saved in the recessive genotype of the individual of the population having a recessive genotype that most closely matches the current best solution (step 615). If the detected change is the first above-threshold change detected in the running of the diploid evolutionary algorithm, such that all recessive genotypes are set to empty or null, then all individuals in the population may have their recessive genotypes populated with the dominant genotype of the most fit individual in the previous generation (e.g., the most fit individual at time t−1). If the detected change is not the first change, the recessive genotypes of the current population may be scanned to find the recessive genotype that is most similar to the dominant genotype of the most fit individual in the previous generation. In some embodiments, a metric similar to Hamming similarity may be used for the similarity determination, such as the following:

$$\text{similarity}_i = \sum_{j=0}^{N} \begin{cases} 1 & \text{if } ind_{ij} = best_j \\ 0 & \text{otherwise} \end{cases}$$

In the exemplary embodiment shown above, the comparison of the allele (e.g., value) of the $j^{th}$ loci (e.g., bit string position) of the individual under consideration is made to the allele of the $j^{th}$ loci of the best individual of the previous generation. Each of N loci in the individual under consideration are compared to the corresponding N loci of the best individual of the previous generation (i.e., a bit-wise comparison of the genotypes is performed). The similarity measure is determined based on the total number of similar bits found in the comparison. In other embodiments, other similarity measures may be utilized. Ties in similarity may be broken at random or based on parameters provided to the algorithm. Once the individual having the most similar recessive genotypes is found, the recessive genotype is set to be the dominant genotype of the best fit individual of the previous generation.

At step 620, the recessive genotypes of each of the individuals in the current population are evaluated for fitness in current environmental conditions by applying the fitness function to the recessive genotypes. Once the recessive genotype of best fitness in the current environment is identified, the individual having the most fit recessive genotype has its dominant genotype replaced with its recessive genotype (step 625). In some embodiments, more than one most fit recessive genotype may be identified (e.g., the top 5, 10, 12, n, etc. most fit recessive genotypes) and the corresponding individuals may have their dominant genotypes replaced with the recessive genotypes. The replacement of dominant genotypes by the recessive genotypes assists in convergence if the current environment is similar to one that was previously encountered.

In some embodiments, mutation (e.g., at step 520 of method 500) may include a hypermutation in which an individual's dominant genotype may assume the value of its recessive genotype. The probability that an individual will undergo such a hypermutation may be provided as a parameter to the evolutionary algorithm. In some embodiments, the probability may be set to be relatively small, such that this form of hypermutation happens infrequently. This form of mutation may help increase the diversity of the current population as well as assist in possible anticipation of environmental changes.

Figure 7:
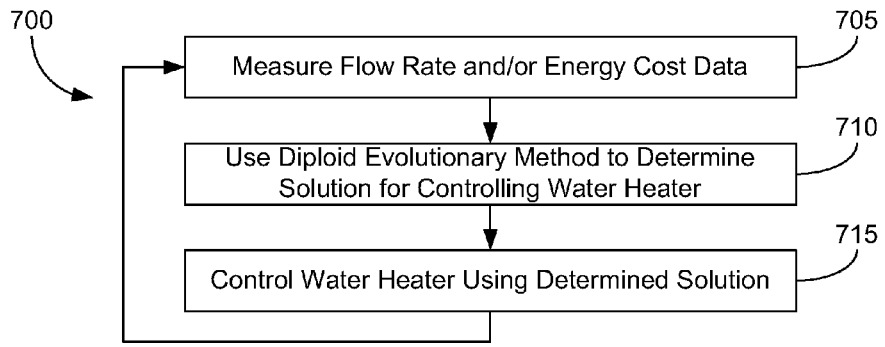
FIG. 7 is a flow diagram of a method of controlling a water heater using a diploid evolutionary algorithm according to an exemplary embodiment.

Referring now to FIG. 7, a flow diagram of a method 700 of controlling a water heater using a diploid evolutionary algorithm is shown according to an exemplary embodiment. Method 700 may be implemented as an agent-based algorithm executed by a processing circuit (e.g., processing circuit 200) that overrides or replaces the operation of a hysteresis loop controller of a water heater during at least some periods of operation.

At step 705, the demanded flow rate from the water heater is measured. The energy cost point may also be measured, if available (e.g., via a smart grid). While the exemplary embodiment shown in method 700 may be described under the assumption that energy cost data is available and desired, in other embodiments, method 700 may proceed in a similar manner without utilizing energy cost data. The flow rate and/or energy cost data may be time stamped to associate the data with a particular date, time, day of week, type of day (e.g., weekday or weekend), etc. The flow rate demand data and energy cost data may be saved in a memory associated with the water heater and/or processing circuit (e.g., memory 210 of processing circuit 200).

At step 710, a diploid evolutionary process may be used to control the operation of the water heater. The diploid evolutionary process may be used to generate control signals that may in turn be used to control the operation of heating devices or elements of the water heater. In various embodiments, the diploid evolutionary process may include any steps and/or features discussed herein with respect to FIGS. 3 through 6.

To carry out the diploid evolutionary process, a population of diploid individuals having a dominant genotype and a recessive genotype may be generated. In some embodiments, the dominant genotype may initially be set to a randomly generated dominant genotype (e.g., a randomly generated control solution) and the recessive genotype may initially be set to be empty. A fitness function may be applied to each of the dominant genotypes to determine the fitness of the solution represented by each dominant genotype for controlling the water heater under the current flow rate and/or energy cost conditions. The fitness function may be based on the flow rate, energy cost, and/or other environmental conditions (e.g., conditions of the operating environment) of the water heater such that the output of the fitness function is indicative of whether the solution represented by each dominant genotype is more or less fit to control the water heater under current conditions than the solutions of other dominant genotypes. The most fit solution from among the dominant genotypes, as determined by application of the fitness function, may be used to evolve the population and arrive at a solution for controlling the water heater. The water heater may then be controlled using the best determined solution (step 715).

Recessive genotypes may be used to store best solutions for particular environments (e.g., as described with respect to methods 300 and 600). If a substantial change (e.g., a change above a defined threshold) in the best fitness of the population is detected, the solutions stored in the recessive genotypes of the population may be scanned to determine if a better solution exists for the changed conditions (e.g., flow rate, energy price) of the water heater. If a better solution exists, that solution may be inserted into a dominant genotype and used to evolve the population in an effort to arrive at better solutions for controlling the water heater under the changed conditions.

Figure 8:
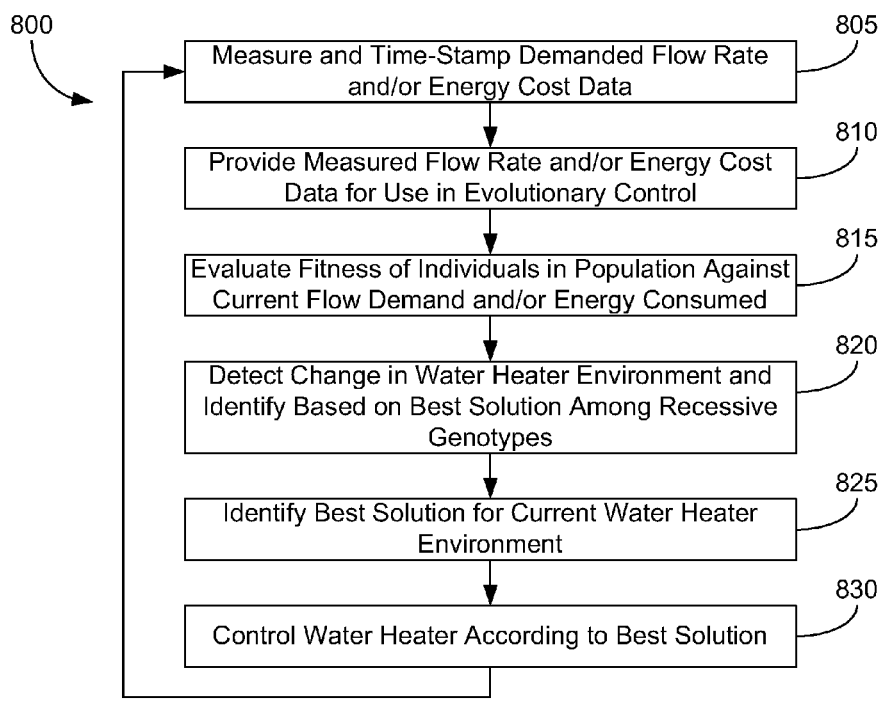
FIG. 8 is a more detailed flow diagram of a method of controlling a water heater using a diploid evolutionary algorithm according to an exemplary embodiment.

Referring now to FIG. 8, a detailed flow diagram of a method 800 of controlling a water heater using a diploid evolutionary algorithm is shown according to an exemplary embodiment. Method 800 includes steps (e.g., more detailed steps) that may be used to carry out method 700. At step 805, data relating to the environment of the water heater, such as flow rate and energy cost data, may be measured and/or time stamped. In some embodiments, the measured data may be stored in a memory of the water heater and/or processing circuit. Water demand causes hot water to be removed from the tank and cooler water to replace the hot water. The new temperature resulting from a demand in water may be represented as follows:

$$tnk_{temp} = \frac{\delta_{in}\tau_{in} + \delta_{cur}\tau_{cur}}{tnk_{size}}$$

In the above, $\delta_{in}$ is the amount of water being replaced in the water heater (i.e., replacing the water demanded), $\tau_{in}$ is the temperature of the water being brought into the water heater, $\delta_{cur}$ is the amount of water currently in the water heater (i.e., after the demanded water has been removed), $\tau_{cur}$ is the temperature of the water currently in the water heater, $tnk_{size}$ is the total volume or amount of water that is contained in the tank of the water heater when full, and $tnk_{temp}$ is the temperature of the water in the tank after the demanded water has been replaced.

At step 810, the flow rate data, energy cost data, tank temperature data, and/or other data regarding the environment of the water heater is provided for use in evolutionary control of the water heater. Agents (e.g., software agents) may be used to evaluate various solutions for controlling the water heater for fitness and to select one or more good solutions for controlling the water heater.

A population of diploid individuals is generated for use in controlling the water heater (e.g., according to method 400) and the fitness of each of the individuals in the population is evaluated based on current environmental conditions of the water heater (step 815 of method 800). The fitness of the individuals may be evaluated using a fitness function that is based on the environmental conditions (e.g., amount of water and/or flow rate demanded, energy cost, temperature of water in tank after demanded water is distributed, etc.). The fitness function may measure the closeness of the operating allowance (e.g., in available hot water and/or allowed energy use) under a solution being tested to that of the actual demand and/or the amount of energy consumed. In some embodiments, the fitness function may be based on water usage patterns (e.g., using time stamped data flow demand data) such that the fitness function may account for past demand during the date, time, day of week, etc. in determining the fitness of the solutions stored in each individual (e.g., in the dominant genotype of each individual). In some embodiments, parameters may be provided (e.g., user-defined, predetermined, etc.) to determine the weight given to each of flow demand, energy cost, and/or other factors within the fitness algorithm in determining the fitness of each solution for the current conditions.

Once the fitness function is defined, the fitness of each of the individuals can be evaluated (e.g., according to method 500). The best solution under the fitness function may be selected for use in controlling the operation of the water heater (step 825). The best solution may also be used to evolve the population in an effort to identify better solutions for the conditions.

At step 820, a change in the environment of the water heater (e.g., flow demand, energy cost, etc.) may be detected and the population may be modified to address the change. In some embodiments, a change in environment may be detected by monitoring inputs from one or more sensors (e.g., using input interface 215 of processing circuit 200). In other embodiments, a change in the environment may be detected by monitoring the best fitness of the population (e.g., in a manner similar to method 600), such that a substantial change is detected if the fitness of the most fit individual in the population drops below a certain threshold or drops by at least a certain value.

Upon detection of a substantial change, the best solution for the previous environmental conditions of the water heater may be saved in a recessive genotype of at least one of the individuals. The recessive genotypes of the population may be scanned to determine one or more recessive genotypes that are most fit for the changed conditions of the water heater (e.g., indicating that they are previous best solutions for similar conditions of flow demand, energy cost, etc.). Once the best fit recessive genotype is found, the individual having the most fit recessive genotype may have its dominant genotype replaced with the most fit recessive genotype. The most fit recessive genotype may be selected for use in controlling the operation of the water heater (step 825). The most fit recessive genotype may also be used to evolve the population to develop more fit solutions for the water heater conditions. The water heater may be controlled using the selected solution (step 830).

Figure 9A:
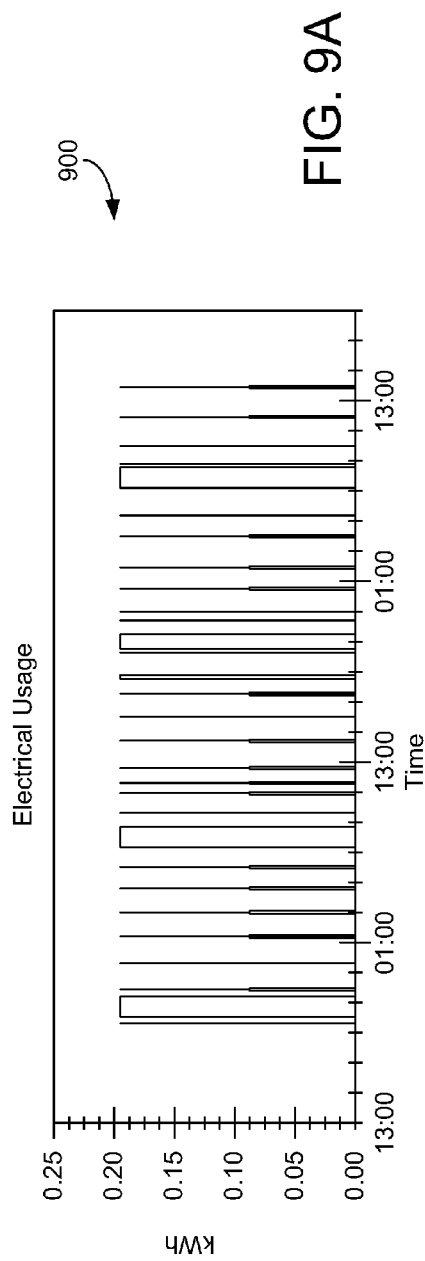
FIGS. 9A and 9B are graphs illustrating power consumption for an example water heater according to exemplary embodiments.
Figure 9B:
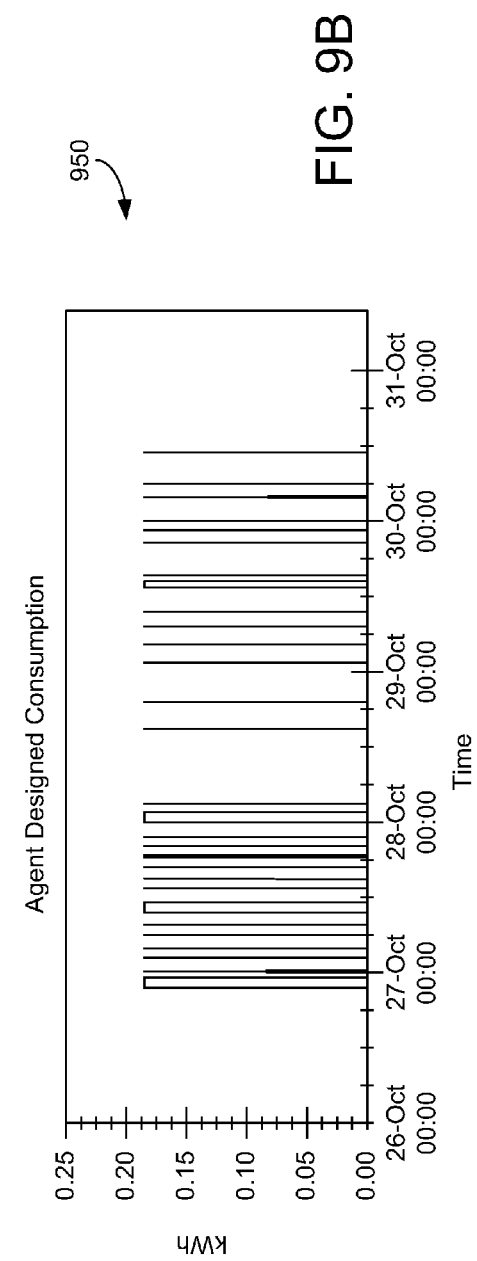

Referring now to FIGS. 9A and 9B, graphs illustrating power consumption for an example water heater are shown according to exemplary embodiments. FIG. 9A includes a graph 900 that illustrates energy consumption on an example water heater controlled without using the diploid evolutionary control methods disclosed herein. FIG. 9B includes a graph 950 that illustrates energy consumption on the example water heater controlled using one or more diploid evolutionary control methods. Comparison of graphs 900 and 950 illustrates that various exemplary diploid evolutionary control methods disclosed herein may allow for the water heater to be operated in a more targeted and/or efficient manner, such that energy is used during periods of anticipated demand, during periods when energy costs are lower, etc.

Various exemplary embodiments disclosed herein may be used to limit the amount of cycling a water heater performs during times in which demand is anticipated (e.g., based on historical data) to be low. In some embodiments, if a demand for water is made during a non-cyclical period (e.g., a period in which the currently selected solution indicates that the water heater should not run), the unit may perform using a normal control method (e.g., hysteresis control) to meet the water demand.

The disclosure is described above with reference to drawings. These drawings illustrate certain details of specific embodiments that implement the systems and methods and programs of the present disclosure. However, describing the disclosure with drawings should not be construed as imposing on the disclosure any limitations that may be present in the drawings. The present disclosure contemplates methods, systems and program products on any machine-readable media for accomplishing its operations. The embodiments of the present disclosure may be implemented using an existing computer processor, or by a special purpose computer processor incorporated for this or another purpose or by a hardwired system. No claim element herein is to be construed under the provisions of 35 U.S.C. §112, sixth paragraph, unless the element is expressly recited using the phrase "means for." Furthermore, no element, component or method step in the present disclosure is intended to be dedicated to the public, regardless of whether the element, component or method step is explicitly recited in the claims.

As noted above, embodiments within the scope of the present disclosure include program products comprising machine-readable media for carrying or having machine-executable instructions or data structures stored thereon. Such machine-readable media can be any available media which can be accessed by a general purpose or special purpose computer or other machine with a processor. By way of example, such machine-readable media can comprise RAM, ROM, EPROM, EEPROM, CD ROM or other optical disk storage, magnetic disk storage or other magnetic storage devices, or any other medium (e.g., non-transitory medium) which can be used to carry or store desired program code in the form of machine-executable instructions or data structures and which can be accessed by a general purpose or special purpose computer or other machine with a processor. Combinations of the above are also included within the scope of machine-readable media. Machine-executable instructions comprise, for example, instructions and data which cause a general purpose computer, special purpose computer, or special purpose processing machine to perform a certain function or group of functions.

Embodiments of the disclosure are described in the general context of method steps which may be implemented in one embodiment by a program product including machine-executable instructions, such as program code, for example, in the form of program modules executed by machines in networked environments. Generally, program modules include routines, programs, objects, components, data structures, etc., that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

Embodiments of the present disclosure may be practiced in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the Internet and may use a wide variety of different communication protocols. Those skilled in the art will appreciate that such network computing environments will typically encompass many types of computer system configurations, including personal computers, hand-held devices, multi-processor systems, microprocessor-based or programmable consumer electronics, network PCs, servers, minicomputers, mainframe computers, and the like. Embodiments of the disclosure may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the disclosure might include a general purpose computing device in the form of a computer, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to a removable optical disk such as a CD ROM or other optical media. The drives and their associated machine-readable media provide nonvolatile storage of machine-executable instructions, data structures, program modules, and other data for the computer.

It should be noted that although the flowcharts provided herein show a specific order of method steps, it is understood that the order of these steps may differ from what is depicted. Also two or more steps may be performed concurrently or with partial concurrence. Such variation will depend on the software and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps. It should also be noted that the word "component" as used herein and in the claims is intended to encompass implementations using one or more lines of software code, and/or hardware implementations, and/or equipment for receiving manual inputs.

The foregoing description of embodiments of the disclosure have been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated.

What is claimed is:

1. A method of controlling a water heater, comprising:
evaluating the fitness of solutions associated with a plurality of individuals in a population for a current operating environment of the water heater, each of the plurality of individuals comprising a dominant genotype and a recessive genotype, wherein each of the genotypes represents a solution for controlling the water heater, wherein a fitness function is applied to the dominant genotype of each individual, wherein the fitness function is based on at least one of water flow demand data and energy price data;
storing previously encountered genotypes in the recessive genotypes of the individuals; and
selecting a solution for controlling operation of the water heater based on the fitness evaluation.

2. The method of claim 1, further comprising detecting a change in the operating environment of the water heater by comparing a best fitness of a current generation of the population with a best fitness of a previous generation of the population.

3. The method of claim 2, wherein detecting a change in the operating environment of the water heater comprises detecting a decrease in the best fitness of the population that exceeds a threshold.

4. The method of claim 2, further comprising:
saving the dominant genotype of an individual having the best fitness of the current generation in a recessive genotype;
determining a recessive genotype that is most fit to the changed operating environment of the water heater under the fitness function; and
replacing a dominant genotype with the recessive genotype that is determined to be most fit to the changed operating environment of the water heater.

5. The method of claim 1, further comprising recombining and mutating the dominant genotype of one or more selected individuals based on the fitness evaluation.

6. The method of claim 1, wherein evaluating the fitness of the plurality of individuals further comprises selecting the one or more selected individuals using a tournament selection based on results of the application of the fitness function to the dominant genotypes of the individuals.

7. The method of claim 1, wherein generating the population comprises populating the dominant genotype of each individual in the population with a randomly generated genotype.

8. A control system, comprising:
an electronic processor configured to
evaluate the fitness of solutions associated with a plurality of individuals in a population for a current operating environment of the water heater, each of the plurality of individuals comprising a dominant genotype and a recessive genotype, wherein each of the genotypes represents a solution for controlling the water heater, wherein a fitness function is applied to the dominant genotype of each individual, wherein the fitness function is based on at least one of water flow demand data and energy price data;
control operation of the water heater based on a genotype selected based on the fitness evaluation; and
store previously selected genotypes in the recessive genotypes of the individuals.

9. The control system of claim 8, wherein the processor is configured to detect a change in the operating environment of the water heater by comparing a best fitness of a current generation of the population with a best fitness of a previous generation of the population.

10. The control system of claim 9, wherein the processor is configured to detect a change in the operating environment of the water heater by detecting a decrease in the best fitness of the population that exceeds a threshold.

11. The control system of claim 8, wherein the processor is configured to save the dominant genotype of an individual having the best fitness of the current generation in a recessive genotype, determine a recessive genotype that is most fit to the changed operating environment of the water heater under the fitness function, and replace a dominant genotype with the recessive genotype that is determined to be most fit to the changed operating environment of the water heater.

12. The control system of claim 8, wherein the processor is configured to recombine and mutate the dominant genotype of one or more selected individuals based on the fitness evaluation.

13. The control system of claim 8, wherein the processor is configured to select the one or more selected individuals using a tournament selection based on results of the application of the fitness function to the dominant genotypes of the individuals.

14. The control system of claim 8, wherein the processor is configured to populate the dominant genotype of each individual in the population with a randomly generated genotype.

15. A non-transitory computer-readable medium having instructions stored thereon, the instructions being executable by a processor to execute a method, the method comprising:
generating a population comprising a plurality of individuals, each individual comprising a dominant genotype and a recessive genotype, wherein each of the genotypes represents a solution for controlling the water heater;
evaluating the fitness of the solutions associated with the plurality of individuals for a current operating environment of the water heater by applying a fitness function to the dominant genotype of each individual, wherein the fitness function is based on at least one of water flow demand data and energy price data;
storing previously encountered genotypes in the recessive genotypes of the individuals; and
controlling operation of the water heater based on a dominant genotype selected based on the fitness evaluation.

16. The non-transitory computer-readable medium of claim 15, wherein the method further comprises detecting a change in the environment of the water heater by comparing a best fitness of a current generation of the population with a best fitness of a previous generation of the population.

17. The non-transitory computer-readable medium of claim 16, wherein detecting a change in the environment of the water heater comprises detecting a decrease in the best fitness of the population that exceeds a threshold.

18. The non-transitory computer-readable medium of claim 15, wherein the method further comprises:
saving the dominant genotype of an individual having the best fitness of the current generation in a recessive genotype;
determining a recessive genotype that is most fit to the changed environment of the water heater under the fitness function; and
replacing a dominant genotype with the recessive genotype that is determined to be most fit to the changed environment.

19. The non-transitory computer-readable medium of claim 15, further comprising mutating the dominant genotype of at least one of the one or more selected individuals based on the fitness evaluation.

20. The non-transitory computer-readable medium of claim 15, wherein evaluating the fitness of the plurality of individuals further comprises selecting the one or more selected individuals using a tournament selection based on results of the application of the fitness function to the dominant genotypes of the individuals.

* * * * *